United States Patent [19]
Taketsugu

[11] Patent Number: 5,566,356
[45] Date of Patent: Oct. 15, 1996

[54] MOBILE COMMUNICATION SYSTEM AND ITS MULTIPLE CONNECTION METHOD ENABLING TO PERFORM CONCISE AND HIGH QUALITY MULTIPLEX COMMUNICATION

[75] Inventor: Masanori Taketsugu, Tokyo, Japan

[73] Assignee: NEC Corporation, Tokyo, Japan

[21] Appl. No.: 356,720

[22] Filed: Dec. 15, 1994

[30] Foreign Application Priority Data

Dec. 27, 1993 [JP] Japan .................................. 5-330554

[51] Int. Cl.$^6$ .............................. H04B 7/26; H04Q 7/22
[52] U.S. Cl. .......................... 455/33.2; 455/56.1; 379/60
[58] Field of Search .................................. 455/33.1–33.4, 455/54.1, 54.2, 56.1; 379/59, 60

[56] References Cited

U.S. PATENT DOCUMENTS

| | | | |
|---|---|---|---|
| 5,305,466 | 4/1994 | Taketsugu | 455/56.1 |
| 5,323,446 | 6/1994 | Kojima et al. | 455/33.2 |
| 5,345,448 | 9/1994 | Keskitalo | 455/33.2 |

OTHER PUBLICATIONS

Chia, S. T. S., "The Control of Handover Initiation in Microcells", *IEEE VTC '91*, 1991, pp. 531–536.

Ishino, Fumiaki et al, "Mobile Communication Switching System for Voice/Nonvoice Services", *IEEE Globecom '91*, 1991, pp. 1485–1489.

Taketsugu, M. et al., "Holonic Location Registration/Paging Procedure in Microcellular Mobile Telecommunication Systems", Electronic Information Communications Association of Japan Transactions RCS91-33, 1991, pp. 29–34.

*Primary Examiner*—Chi H. Pham
*Attorney, Agent, or Firm*—Foley & Lardner

[57] ABSTRACT

A mobile communication system and its multiple connection method enabling to perform concise and high quality multiplex communication, in which a mobile exchange station stores identifiers of a plurality of radio base stations and transmits a communication signal directed to a mobile station to all the radio base stations. The mobile exchange station stores the identifier of the radio base station which started the communication with the mobile station within the plurality of radio base stations. When the radio base station has opened a radio line with the mobile station, the radio base station which received the communication signal transmits the communication signal to a radio zone, and when the radio base station does not open the radio line with the mobile station, the radio base station disuses the received communication signal. When receiving a communication channel handover request, the radio base station which received the communication signal directed to the mobile station from the mobile exchange station executes a handover processing directly, and when not having received the communication signal, the radio base station requests the mobile exchange station to transmit the communication signal to carry out a multiple connection processing.

12 Claims, 9 Drawing Sheets

FIG. 2

| PARTICULAR RADIO BASE STATION IDENTIFIER | MULTI-DESTINATION RADIO BASE STATION IDENTIFIERS | |
|---|---|---|
| BS1 | BS2 | BS4 |
| BS2 | BS3 | BS5 |
| BS3 | BS4 | BS5 |
| ⋮ | ⋮ | ⋮ |

| MOBILE STATION IDENTIFIER | MULTIPLE CONNECTION START RADIO BASE STATION IDENTIFIER |
|---|---|
| MS1 | BS1 |
| MS2 | BS3 |
| ⋮ | ⋮ |

| COMMUNICABLE MOBILE STATION IDENTIFIERS |
|---|
| MS1    MS2 |

| COMMUNICABLE MOBILE STATION IDENTIFIER |
|---|
| MS2 |

~132

(a): WHEN SIGNAL DIRECTED TO MOBILE STATION IS TRANSMITTED.
(b): WHEN NO SIGNAL DIRECTED TO MOBILE STATION IS TRANSMITTED.

FIG. 10A
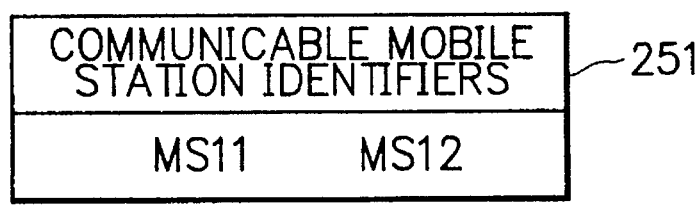
FIG. 10B
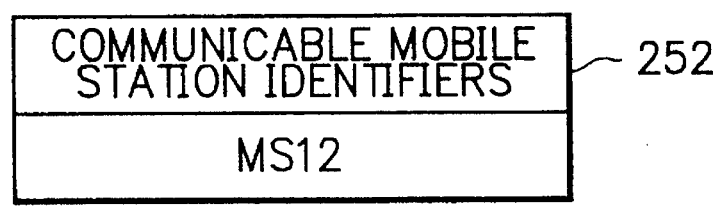
FIG. 11
| MOBILE STATION IDENTIFIER | MULTIPLE CONNECTION START RADIO BASE STATION IDENTIFIER |
|---|---|
| MS11 | BS11 |
| MS12 | BS14 |
| ⋮ | ⋮ |
240

(a): WHEN SIGNAL DIRECTED TO MOBILE STATION IS TRANSMITTED.

(b): WHEN NO SIGNAL DIRECTED TO MOBILE STATION IS TRANSMITTED.

MOBILE COMMUNICATION SYSTEM AND ITS MULTIPLE CONNECTION METHOD ENABLING TO PERFORM CONCISE AND HIGH QUALITY MULTIPLEX COMMUNICATION

BACKGROUND OF THE INVENTION

The present invention relates to a mobile communication system and its multiple connection method which enable to perform concise and high quality multiple communication, and more particularly to a mobile communication system and its multiple connection method at handovers in the mobile communication system composed of a plurality of radio zones.

DESCRIPTION OF THE RELATED ARTS

In a conventional mobile communication system such as a car phone, a portable phone or the like, a small zone method for covering all service areas by a plurality of radio zones is used. In this case, the radio zone means a range that each radio base station executes a communication with one mobile station mounted on an automobile or the like using a radio channel. Also, one radio base station is placed for one radio zone, and a plurality of mobile stations can freely move between the radio zones. Each radio base station can use a plurality of radio channels and determine one radio channel for use on the basis of the radiowave propagation between the radio base station and the mobile station. Moreover, the radio base station can change to another radio channel during the communication when the radiowave propagation environment of the used radio channel deteriorates. This is called a channel handover during the communication. The apparatus for controlling this radio base station and carrying out a line exchange with a fixed telephone network is a mobile exchange station.

As to the handover method, two typical methods are known, that is, backward handover to initiate a handover process via an old (before handover) radio channel and forward handover to initiate the handover process via a new (after handover) radio channel, as disclosed in "The Control of Handover Initiation in Microcells" by S. T. S. Chia, IEEE VTC '91, pp. 531–536, 1991.

In the conventional method, as disclosed in "Mobile Communication Switching System for Voice/Nonvoice Services" by Fumiaki ISHINO et al., IEEE GLOBECOM '91. pp. 1485–1489, 1991, in a mobile exchange station, at the handover, a multiple connection is used to connect an old radio base station and a new radio base station so as to prevent an instant intermission at the handover.

For realization of high quality services of both voice communication and mobile data communication in the mobile communication system, the prevention of this instant intermission at the handover is required. However, the prevention of the instant intermission necessitates technical supports of wired systems between the mobile exchange station and the radio base station and of wireless systems between the radio base station and the mobile station.

In the conventional system, in order to prevent the instant intermission at the handover, the multiple connection between the mobile exchange station and the radio base station is used. However, in future, when the number of subscribers to be accommodated will increase to narrow the radio zone and to adopt a microcellular environment, the number of the handover times increases. As a result, complicated operations of the mobile exchange station and the radio base station, for example, the multiple connection at the handover and the return to the single connection increase.

SUMMARY OF THE INVENTION

Accordingly, it is an object of the present invention to provide a mobile communication system in view of the aforementioned problems of the prior art, which is capable of performing a concise and high quality multiple communication.

It is another object of the present invention to provide a multiple connection method of a mobile communication system, which is capable of performing a concise and high quality multiple communication.

In order to attain the above objects, according to the present invention, a mobile communication system including a plurality of radio base stations, a mobile station communicating with the radio base stations using a radio channel in a plurality of radio zones composed of the radio base stations, and a mobile exchange station for controlling predetermined radio base stations communicating with the mobile station, comprises first storage means for storing multiple connection start information relating to the radio base station which started a communication with the mobile station; and second storage means for storing multiple connection information of identifiers of at least two radio base stations to which a communication signal directed to the mobile station which started the communication is simultaneously transmitted, only one of at least the two radio base stations which received the communication signal transmitting the communication signal to the radio zone, the radio base stations corresponding to the identifiers as the multiple connection information stored in the second storage means being selectively handed over to execute the communication.

Also, the first and second storage means are provided in the mobile exchange station and a handover processing in transmitting the communication signal to the radio zone by the selective handover is carried out by a time division multiple access method.

Further, in the handover processing, the mobile station requests a handover of the radio base stations to start a new communication with another one of the radio base stations corresponding to the identifiers as the multiple connection information stored in the second storage means. In this case, when the radio base station to meet the request of the mobile station is not contained in the multiple connection information, the mobile exchange station renews the content of the multiple connection information so as to contain the radio base station to meet the request in the multiple connection information to execute the handover processing Further, according to the present invention, a multiple connection method of a mobile communication system including a plurality of radio base stations, a mobile station communicating with the radio base stations using a radio channel in a plurality of radio zones composed of the radio base stations, and a mobile exchange station for controlling predetermined radio base stations communicating with the mobile station, comprises the steps of first storage step for storing multiple connection start information relating to the radio base station which started a communication with the mobile station; and second storage step for storing multiple connection information of identifiers of at least two radio base stations to which a communication signal directed to the mobile station which started the communication is simultaneously transmitted, only one of at least the two radio base stations which received the communication signal transmitting the communication signal to the radio zone, the radio base stations corresponding to the identifiers as the multiple connection information stored in the second storage step being selectively handed over to execute the communication.

Also, a handover processing in transmitting the communication signal to the radio zone by the selective handover is carried out by a time division multiple access method.

Further, in the handover processing, the mobile station requests a handover of the radio base stations to start a new communication with another one of the radio base stations corresponding to the identifiers as the multiple connection information stored in the second storage step. In this case, when the radio base station to meet the request of the mobile station is not contained in the multiple connection information, the mobile exchange station renews the content of the multiple connection information so as to contain the radio base station to meet the request in the multiple connection information to execute the handover processing.

Moreover, according to the present invention, a multiple connection method of a mobile communication system including a plurality of radio base stations, a mobile station communicating with the radio base stations using a radio channel in a plurality of radio zones composed of the radio base stations, and a mobile exchange station for controlling predetermined radio base stations communicating with the mobile station, comprises the steps of: first storage step for storing an identifier of the radio base station which started a communication with the mobile station as multiple connection start information by the mobile exchange station; transmitting step for transmitting a communication signal including the identifier of the radio base station which started the communication to all the radio base stations controlled by the mobile exchange station: second storage step for storing the identifiers of a plurality of radio base stations including each radio base station itself as multiple connection information by each radio base station; selective receiving step for receiving only the communication signal including the identifier stored in the second storage step by the radio base stations; checking step for checking whether or not the radio base station which received the communication signal in the receiving step opens a radio line with the mobile station; and signal processing step for either transmitting the received communication signal to the radio zone by the radio base station when the radio base station opens the radio line with the mobile station or disusing the received communication signal when the radio base station does not open the radio line with the mobile station as a result in the checking step.

Also, the radio base station executes the handover processing in response to a radio channel handover request of the mobile station.

Further, when the radio base station receives the communication signal in the selective receiving step, the handover processing is directly executed and, when the radio base station does not receive the communication signal in the selective receiving step, after the radio base station allows the mobile exchange station to change the identifier of the radio base station which started the communication with the mobile station in the multiple connection information stored in the mobile exchange station to its own identifier and transmits the communication signal directed to the mobile station to the radio base stations contained in the multiple connection information assigned to the radio base station itself to execute a multiple connection processing, the handover processing is executed.

Hence, in the mobile communication system and its multiple connection method enabling to perform concise and high quality multiplex communication according to the present invention, an essential part of the multiple connection method stores the multiple connection start information relating to the radio base station which started the communication with the mobile station and stores the multiple connection information of the identifiers of at least two radio base stations to which the communication signal directed to the mobile station which started the communication is simultaneously transmitted. Hence, only one of at least the two radio base stations which received the communication signal transmits the communication signal to the radio zone, and the radio base stations corresponding to the identifiers stores as the multiple connection information can be selectively handed over to execute the communication.

Further, in the multiple connection method of a mobile communication system according to the present invention, the identifier of the radio base station which started the communication with the mobile station is stored as the multiple connection start information, and the communication signal including the identifier of the radio base station which started the communication is transmitted to all the radio base stations controlled by the mobile exchange station, and each radio base station stores the identifiers of a plurality of radio base stations including each radio base station itself as multiple connection information. Accordingly, the radio base stations receive only the communication signal including the stored identifier and the radio base station which received the communication signal checks whether or not to have opened the radio line with the mobile station. As a result of this checking, when the radio base station opens the radio line with the mobile station, the received communication signal is transmitted to the radio zone, and, when the radio base station does not open the radio line with the mobile station, the received communication signal is disused. As a result, the multiplex communication can be carried out.

BRIEF DESCRIPTION OF THE DRAWINGS

The objects, features and advantages of the present invention will become more apparent from the consideration of the following detailed description, taken in conjunction with the accompanying drawings, in which:

FIG. 2 is a schematic diagram showing a multiple connection information table stored in a mobile exchange station shown in FIG. 1;

FIG. 3 is a schematic diagram showing a multiple connection start information table stored in the mobile exchange station shown in FIG. 1;

FIGS. 4A and 4B are schematic diagrams showing communicable mobile station tables held in radio base stations used in the mobile communication system shown in FIG. 1;

FIGS. 10A and 10B are schematic diagrams showing communicable mobile station tables held in the radio base stations shown in FIG. 6;

FIG. 11 is a schematic diagram showing a multiple connection start information table stored in the mobile exchange station shown in FIG. 6.

DESCRIPTION OF THE PREFERRED EMBODIMENTS

Figure 1:
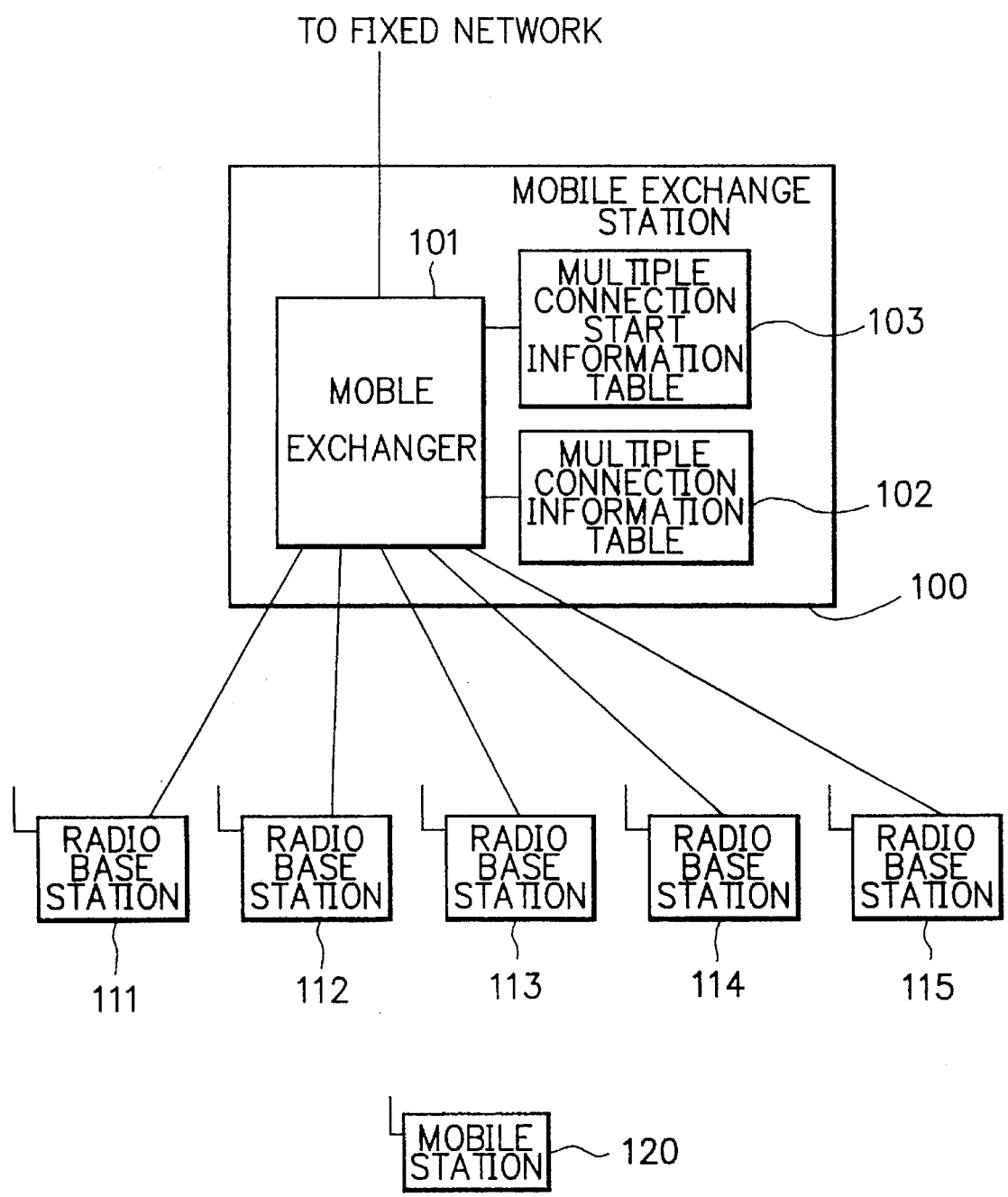
FIG. 1 is a block diagram of a first embodiment of a mobile communication system applicable to a multiple connection method according to the present invention.

The present invention will now be described in connection with its preferred embodiments with reference to the accompanying drawings, wherein like reference characters designate like or corresponding parts throughout the views and thus the repeated description thereof can be omitted for brevity. In FIGS. 1 to 5, there are shown the first embodiment of a mobile communication system and its multiple connection method according to the present invention, and FIGS. 6 to 12 illustrate the second embodiment of a mobile communication system and its multiple connection method according to the present invention.

In FIG. 1, there is shown the first embodiment of a mobile communication system to be applied to a multiple connection method according to the present invention. In FIG. 1, the mobile communication system comprises a mobile exchange station 100, a plurality of radio base stations 111 to 115 and a mobile station 120, and the mobile exchange station 100 includes a mobile exchanger 101, a multiple connection information table 102 and a multiple connection start information table 103. The radio base stations 111 to 115 can be identified by radio base station identifiers BS1 to Bs5, respectively. In this case, the radio base stations 111 to 115 having the respective radio base station identifiers BS1 to BS5 are connected to the mobile exchange station 100 in a star configuration.

FIG. 2 illustrates one embodiment of the multiple connection information table 102 which is stored within the mobile exchange station 100 and is used for realizing the multiple connection method according to the present invention. The multiple connection information table 102 contains a table of the radio base station identifiers for identifying a particular radio base station to which the mobile exchange station 100 transmits a communication signal and multi-destination radio base stations to which the mobile exchange station 100 transmits the same communication signal as the one transmitted to the particular radio base station with respect to the controllable radio base stations 111 to 115 having the radio base station identifiers. That is, the particular radio base station to receive the communication signal and the multi-destination radio base stations to receive the same communication signal as the one transmitted to the particular radio base station are classified by the radio base station identifiers. In the case exemplified in FIG. 2, it can be understood that the transmission signal is sent to the particular radio base station having the radio base station identifier BS1 as well as to the multi-destination radio base stations having the radio base station identifiers BS2 and BS4. Similarly, the transmission signal is also sent to the multi-destination radio base stations having the radio base station identifier BS3 and BS5 in addition to the particular radio base station having the radio base station identifier BS2.

FIG. 3 shows one embodiment of the multiple connection start information table 103 which is used for executing the multiple connection method and is stored within the mobile exchange station 100. This multiple connection start information table 103 contains the information representing which one of the radio base stations to be specified by the multiple connection start information table 103 the mobile station 120 to be called, being controlled by the mobile exchange station 100, starts the multiple connection. In the case shown in FIG. 3, it can be understood that the mobile station 120 having a mobile station identifier MS1 executes the multiple connection with the radio base station having the radio base station identifier BS1 as a main station. In turn, the mobile station 120 having the mobile station identifier MS2 conducts the multiple connection with the radio base station having the radio base station identifier BS3 as the main station.

FIGS. 4A and 4B illustrate communicable mobile station tables 131 and 132 which are held by the radio base stations and are used for performing the multiple connection process. This communicable mobile station table 131 or 132 indicates that to which mobile station the communication signal sent from the mobile exchange station 100 to each radio base station is forwarded. For example, FIG. 4A shows the communicable mobile station table 131 of the radio base station 112 and FIG. 4B shows the communicable mobile station table 132 of the radio base station 113. It can be understood from these communicable mobile station tables 131 and 132, that the radio base station 112 is communicable with the mobile station having the mobile station identifier MS1 or MS2 and the radio base station 113 is communicable with the mobile station having the mobile station identifier MS2.

Next, in the case where the mobile station 120 has started the communication with a terminal on a fixed network side using the radio zone of the radio base station 111, a handover process will now be described with reference to FIG. 1 to FIG. 5.

First, in the multiple connection information table 102 stored in the mobile exchange station 100, the two multi-destination radio base station identifiers BS2 and BS4 of the respective multi-destination radio base stations 112 and 114 are contained in the multi-destination radio base station identifier column corresponding to the radio base station identifier BS1 of the radio base station 111 contained in the particular radio base station identifier column. Accordingly, the communication signal sent from the terminal on the fixed network side to the mobile station 120 is also transmitted to the radio base stations 112 and 114 besides the radio base station 111. Since the radio base station 111 opens the radio line to the mobile station 120, the communication signal transmitted to the radio base station 111 is sent to the mobile station 120 via the radio line, just as it is. On the other hand, since the radio base stations 112 and 114 do not open any radio line to the mobile station 120, the above communication signal sent to the radio base stations 112 and 114 is further disused.

Next, the movement of the mobile station 120 from the radio zone of the radio base station 111 to the radio zone of the radio base station 112 and the execution of backward handover will be described. After receiving a radio channel handover request from the mobile station 120, the radio base station 111 asks the radio base station 112 via the mobile exchange station 100 about the information of the radio channel to be assigned to the mobile station 120 and informs the usable radio channel information to the mobile station 120. Since the communicable mobile station table 131 includes the mobile station identifier MS1 of the above mobile station 120, the radio base station 112 does not process anything for a multiple connection renewal. When the mobile station 120 opens the radio line to the radio base station 112 after receiving the above radio channel information, the radio base station 111 transmits the communication signal directed to the mobile station 120 to the radio line open to the mobile station 120 to allow the communication to be intermittent.

Figure 5:
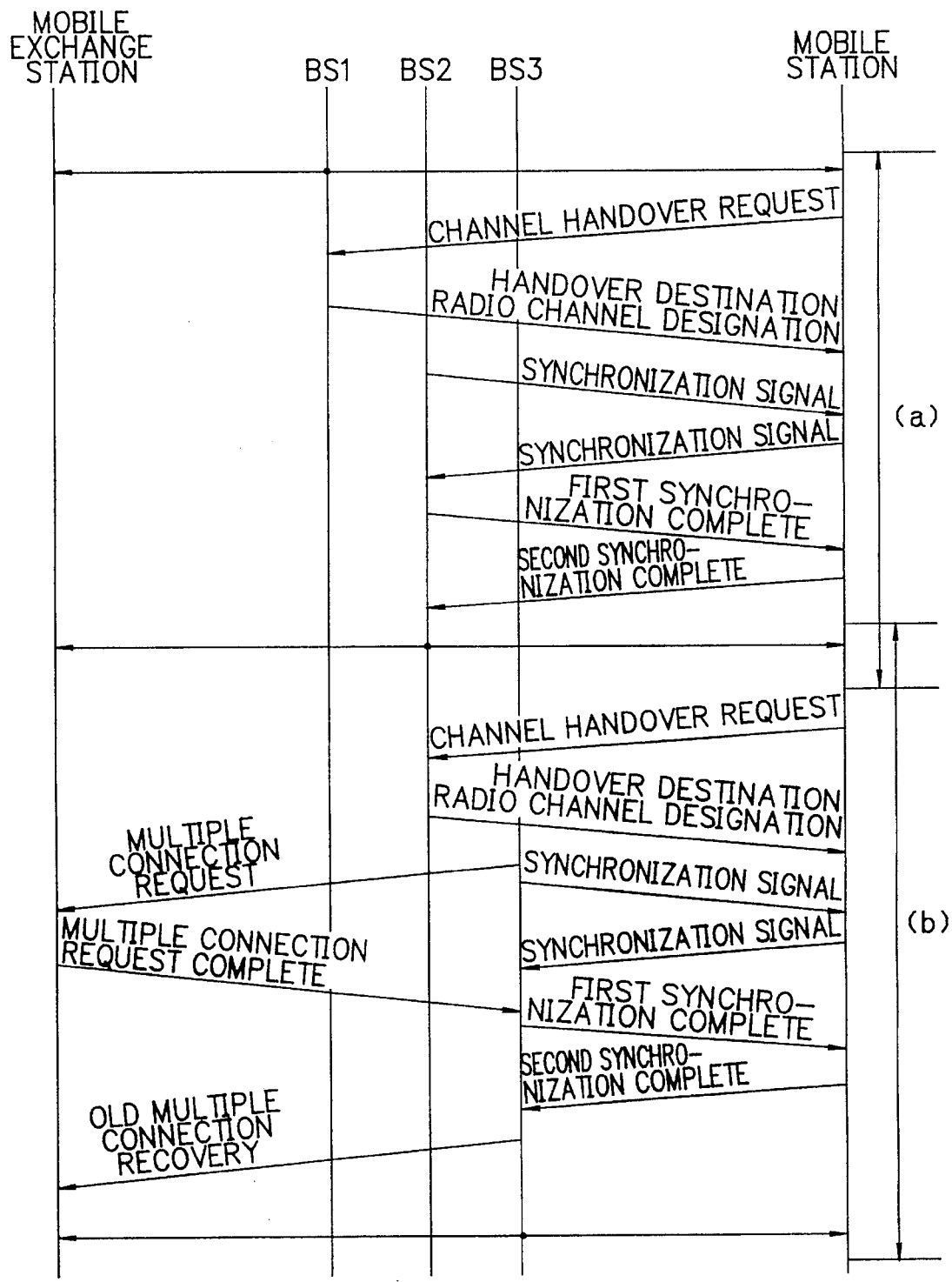
FIG. 5 is a schematic diagram for explaining handover process in the mobile communication system shown in FIG. 1.

One example of the signal flow in the above handover process is illustrated in part (a) shown in FIG. 5, wherein a straight coupling line having both end arrows between the mobile exchange station and the mobile station indicates in course of communication, and a black circle on the coupling line indicates that the mobile station has opened the communication line to the radio base station attached with this black circle, and a white circle on the coupling line indicates that the communication signal forwarded to the radio base stations has reached the radio base station attached with this white circle.

While the mobile station 120 telephones via the radio base station having the radio base station identifier BS1, a channel handover request is transmitted from the mobile station to the radio base station 111. When a handover destination radio channel designation is transmitted from the radio base station 111 to the mobile station, the mobile station waits for reception of a synchronization signal 3O output from the handover destination radio base station 112 having the radio base station identifier BS2. Thereafter, since the radio base station 112 has received the communication signal directed from the mobile exchange station 100 to the mobile station 120 having the mobile station identifier MS1, as indicated by the communicable mobile station table 131, the radio base station 112 does not process anything on the multiple connection. When receiving the synchronization signal, the mobile station transmits the synchronization signal to replay. After receiving the synchronization signal from the mobile station, the handover destination radio base station 112 transmits a first synchronization completion signal. When receiving the first synchronization completion signal, the mobile station transmits a second synchronization completion signal and hands over the radio line. For instance, in the case where the radio zone access is a TDMA (time division multiple access) method, these radio channel handover processing is executed in the time except during the communication. By this process, the instant intermission at the radio channel handover can be prevented.

Then, the movement of the mobile station 120 from the radio zone of the radio base station 112 to the radio zone of the radio base station 113 and the execution of the backward handover will be described. When receiving a "channel handover request" from the mobile station 120, the radio base station 112 asks the radio base station 113 via the mobile exchange station 100 about the information of the radio channel to be allocated to the mobile station 120 and advises the information of the obtained usable "handover destination radio channel designation" to the mobile station 120. The mobile station 120 will open the radio line to the radio base station 113.

The opening of the radio line is conducted in the following procedure. That is, the radio base station 113 having the radio base station identifier BS3 has not received the communication signal directed to the mobile station 120 from the mobile exchange station 100, as shown by the communicable mobile station table 132. Hence, the radio base station 113 gives a "multiple connection request" to the mobile exchange station 100 to allow the mobile exchange station 100 to forward the communication signal directed to the mobile station 120. In response to this multiple connection request, the mobile exchange station 100 changes the radio base station identifier BS1 written in the column of the mobile station identifier MS1 in the multiple connection start information table 103 to the radio base station identifier BS3.

According to the changed multiple connection information table 102, the communication signal directed to the mobile station 120 is also transmitted to the radio base stations 113 to 115 having the respective radio base station identifiers BS3 to BS5. When receiving this communication signal directed to the mobile station, the radio base station 113 opens the radio line with the mobile station to continue the communication and executes a processing for recovering the multiple connection with the radio base station 111 having the radio base station identifier BS1 as the main station.

One example of the signal flow in the above handover process is illustrated in part (b) shown in FIG. 5, wherein the straight coupling line having both the end arrows, the black circle on the coupling line, and the white circle on the coupling line indicate the same as those of part (a) in FIG. 5.

While the mobile station telephones via the radio base station 112 having the radio base station identifier BS2 and the "channel handover request" is transmitted from the mobile station to the radio base station 112. When the "handover destination radio channel designation" is transmitted from the radio base station 112 to the mobile station, the mobile station waits for the reception of the "synchronization signal" output from the handover destination radio base station 113 having the radio base station identifier BS3. At this time, since the radio base station 113 has not received the communication signal directed from the mobile exchange station 100 to the mobile station 120, the radio base station 113 transmits the "multiple connection request" signal to the mobile exchange station 100. When receiving the synchronization signal from the handover destination radio base station 113, the mobile station transmits the synchronization signal.

After receiving this synchronization signal from the mobile station, the handover destination radio base station 113 receives a "multiple connection request completion" signal from the mobile exchange station 100 and waits the execution of the multiple connection. After the multiple connection, the radio base station 113 transmits the "first synchronization completion" signal. When receiving the first synchronization completion signal, the mobile station transmits the "second synchronization completion" signal. After receiving the second synchronization completion signal, the radio base station 113 opens the radio line to the mobile station to continue the communication and also transmits an "old multiple connection recovery" signal to the mobile exchange station 100. In the case where, for example, the zone access is the TDMA method, the radio channel handover processing is performed in the time except during the communication to prevent the instant intermission at the radio channel handover.

Figure 6:
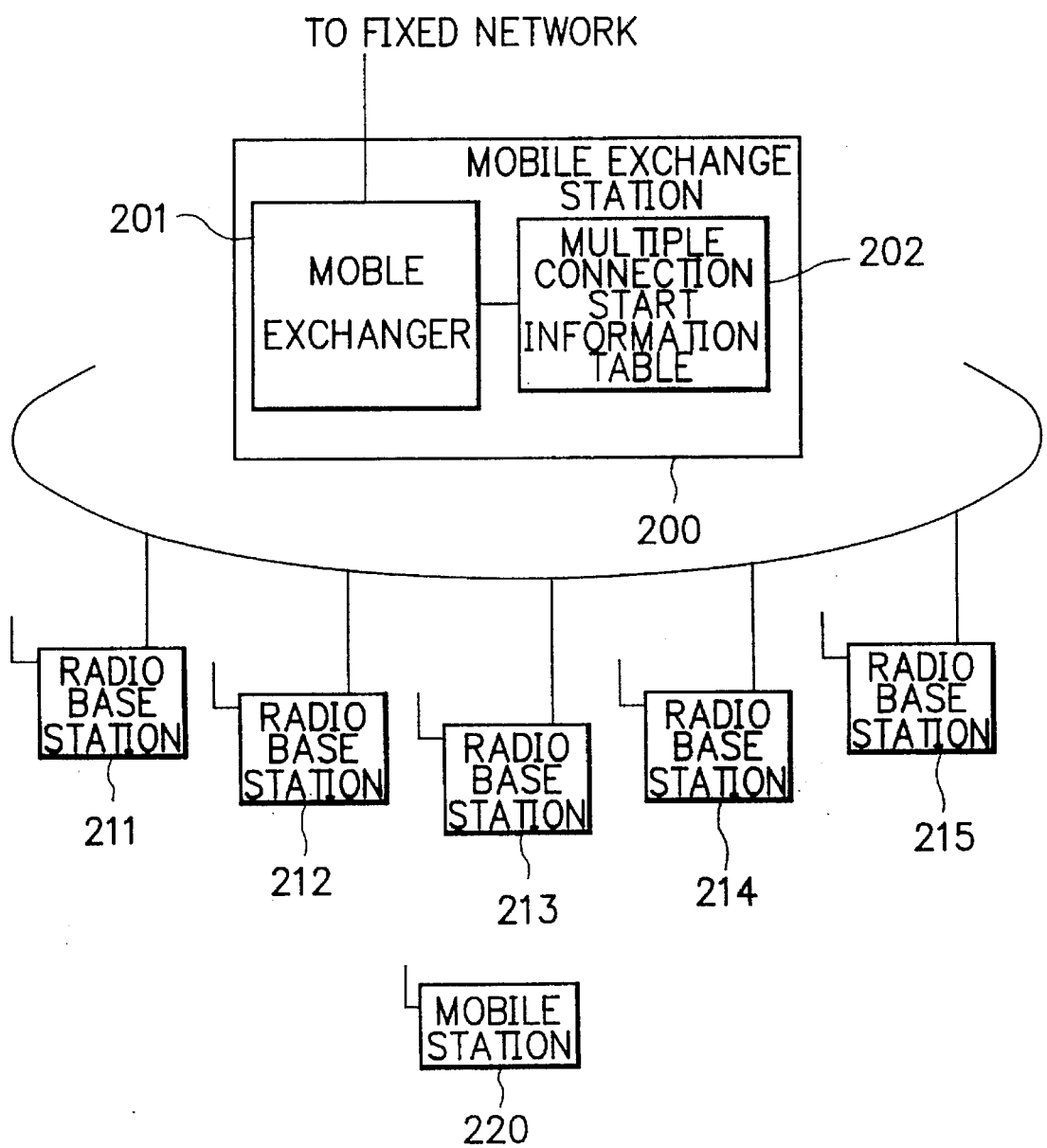
FIG. 6 is a block diagram of a second embodiment of a mobile communication system applicable to another multiple connection method according to the present invention.

In FIG. 6, there is shown the second embodiment of a mobile communication system to realize a multiple connection method according to the present invention. In FIG. 6, the mobile communication system comprises a mobile exchange station 200, a plurality of radio base stations 211 to 215 and a mobile station 220, and the mobile exchange station 200 includes a mobile exchanger 201 and a multiple connection start information table 202. The radio base stations 211 to 215 can be identified by radio base station identifiers BS11 to BS15, respectively. In this case, the radio base stations 211 to 215 having the respective radio base station identifiers BS11 to BS15 are coupled with the mobile exchange station 200 in a multi-destination connection configuration such as a LAN (local area network).

Figure 7:
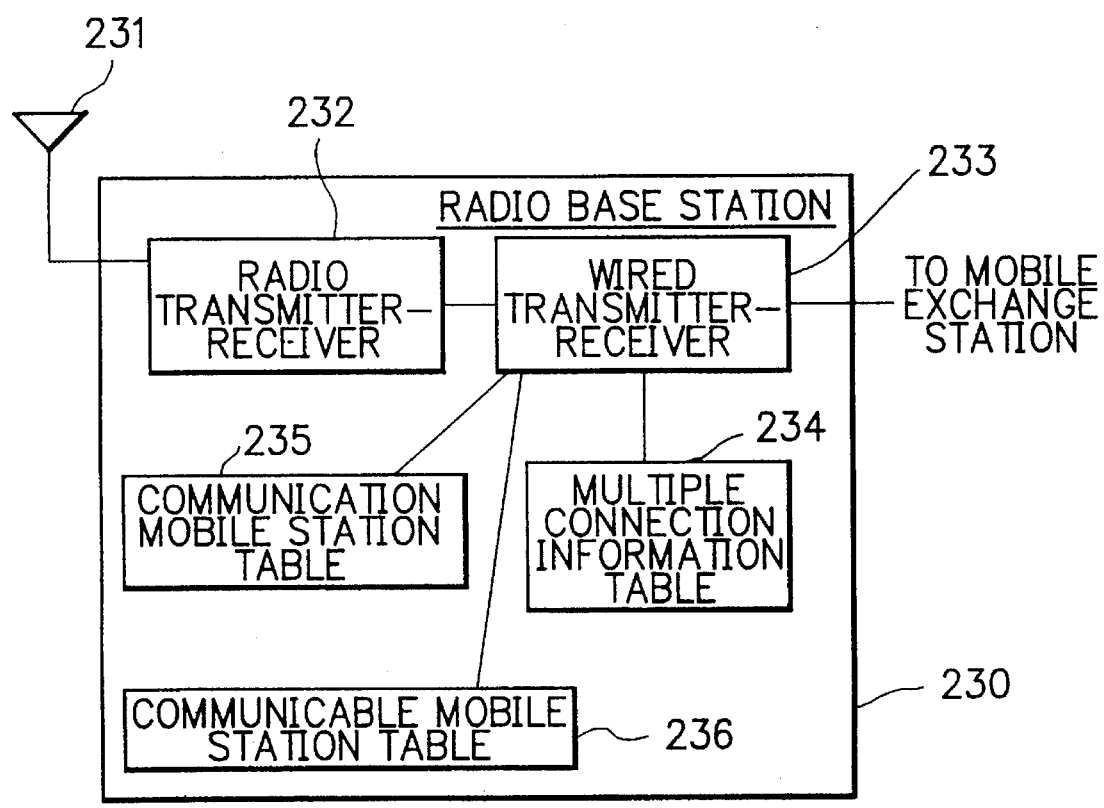
FIG. 7 is a block diagram of radio base stations used in the mobile communication system shown in FIG. 6.

FIG. 7 illustrates one embodiment of a radio base station 230. As shown in FIG. 7, the radio base station 230 includes an antenna 231, a radio transmitter-receiver 232, a wired transmitter-receiver 233, a multiple connection information table 234, a communication mobile station table 235 and a communicable mobile station table 236. The wired transmitter-receiver 233 receives only the communication signals forwarded to the radio base stations having the identifiers stored in the multiple connection information table 234, records to which mobile station or stations the communication signal or signals received are directed into the communicable mobile station table 236, transmits only the communication signal or signals of the received communication signals, to be directed to the mobile station or stations having the identifiers shown in the communication mobile station table 235 to the mobile station or stations via the radio transmitter-receiver 232 and the antenna 231, and disuses the communication signal or signals directed to the mobile station or stations not shown in the communication mobile station table 235.

Figure 8A:
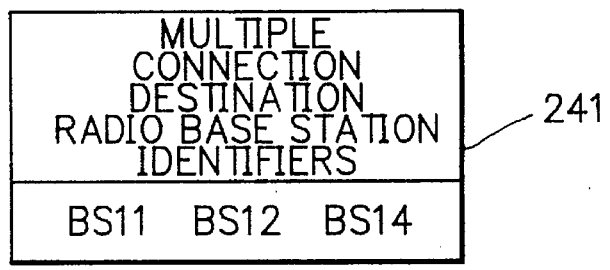
FIGS. 8A to 8C are schematic diagrams showing multiple connection information tables stored in the respective radio base stations shown in FIG. 6.
Figure 8B:
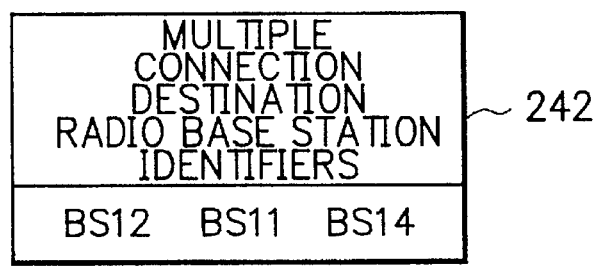
Figure 8C:
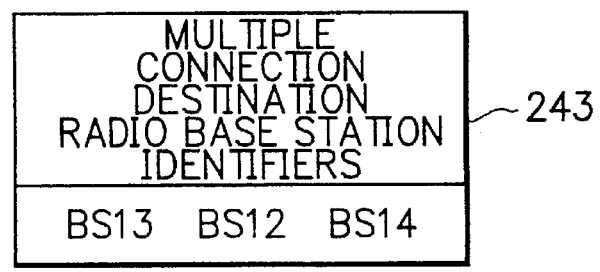

FIGS. 8A, 8B and 8C show examples of the multiple connection information table which is stored within each radio base station used for realizing the second embodiment of the multiple connection method according to the present invention. In these drawings, the multiple connection information table contains its own identifier of each radio base station and the identifiers of the destination radio base stations of the communication signal to be received by each radio base station. FIGS. 8A, 8B and 8C illustrate respective multiple connection information tables 241, 242 and 243 stored in the respective radio base stations 211, 212 and 213 having the radio base station identifiers BS11, BS12 and BS13. It is understood from FIG. 8A that the radio base station 211 having the radio base station identifier BS11 receives the communication signals directed to the radio base stations 212 and 214 having the respective radio base station identifiers BS12 and BS14 in addition to the communication signal directed to the radio base station 211. Similarly, FIG. 8B shows that the radio base station 212 having the radio base station identifier BS12 receives the communication signals directed to the radio base stations 211 and 214 having the respective radio base station identifiers BS11 and BS14 in addition to the communication signal directed to the radio base station 212. Further, similarly, FIG. 8C shows that the radio base station 213 having the radio base station identifier BS13 receives the communication signals directed to the radio base stations 212 and 214 having the respective radio base station identifiers BS12 and BS14 in addition to the communication signal directed to the radio base station 213.

Figure 9:
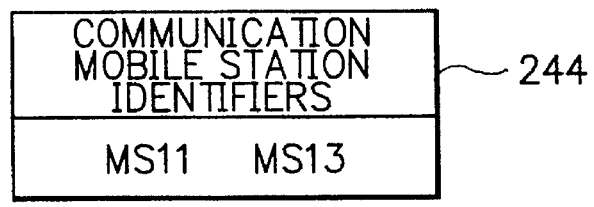
FIG. 9 is a schematic diagram showing a communication mobile station table stored in the radio base stations shown in FIG. 6.

FIG. 9 shows one example of the communication mobile station table which is stored in the radio base stations used for realizing the second embodiment of the multiple connection method according to the present invention. From FIG. 9, it is understood that the radio base station having this communicating mobile station table 244 communicates with the mobile stations having the mobile station identifiers MS11 and MS13.

FIGS. 10A and 10B illustrate examples of the communicable mobile station table which is held within the radio base stations used for realizing the second embodiment of the multiple connection method according to the present invention. The communicable mobile station table shows to which mobile station or stations the communication signal or signals directed are transmitted from the mobile exchange station to each radio base station. FIGS. 10A and 10B show communicable mobile station table 251 and 252 of the respective radio base stations 212 and 213 and show that the radio base station 212 can communicate with the mobile stations having the mobile station identifiers MS11 and MS12 and the radio base station 213 can communicate with the mobile station having the mobile station identifier MS12.

FIG. 11 shows one example of the multiple connection start information table 202 which is stored in the mobile exchange station used for realizing the second embodiment of the multiple connection method according to the present invention. In FIG. 11, the multiple connection start information table 240 contains the information representing from which one of the radio base stations the mobile station to be called, being controlled by the mobile exchange station, has started the multiple connection. That is, it can be understood that the mobile station having the mobile station identifier MS11 or MS12 has started the multiple connection from the radio base station having the radio base station identifier BS11 or BS14.

Next, in the case where the mobile station 220 has started the communication with the terminal on the fixed network side using the radio zone of the radio base station 211, a handover process will now be described with reference to FIG. 6, FIGS. 8A to 8C to FIG. 12.

First, in the multiple connection start information table 202 stored in the mobile exchange station 200, as shown in FIG. 11, the radio base station identifier BS11 of the radio base station 211 is contained in the multiple connection start radio base station identifier column corresponding to the mobile station identifier MS11 of the mobile station 220 contained in the mobile identifier column. Hence, the communication signal sent from the terminal on the fixed network side to the mobile station 220 is transmitted to the radio base station 211 and the communication signal sent to the mobile station 220 existent in the radio zone of this radio base station is transmitted to the radio base station 211. Since the mobile station 220 is existent in the radio zone of this radio base station and has opened the radio line, the communication signal is transmitted to the mobile station 220 via this radio line.

At this time, the radio base station 211 receives the communication signal directed to the radio base station 214 having the radio base station identifier BS14 as well according to the multiple connection information table 241. However, since the communication mobile station table 244 of the radio base station 211 does not contain the mobile station identifier MS12 of the mobile station, as shown in FIG. 9, the communication signal forwarded to the mobile station having the mobile station identifier MS12 is disused in the mobile exchange station.

Next, the movement of the mobile station 220 from the radio zone of the radio base station 211 to the radio zone of the radio base station 212 and the execution of forward handover will be described. After receiving a radio channel handover request from the mobile station 220, the radio base station 212 has received the communication signals directed from the mobile exchange station 200 to the radio base station 211 having the radio base station identifier BS11 according to its own multiple connection information table 242, and as indicated by the communicable mobile station table 251, the communication signal directed to the mobile station 220 having the mobile station identifier MS11 is included in the above communication signals. Hence, the radio base station 212 transmits the communication signal directed to the mobile station 220 within the communication signals directed to the radio base station 211 to the radio line opened to the mobile station 220 to continue the communication. At this time, no processing for the multiple connection in the mobile exchange station 200 is required.

Figure 12:
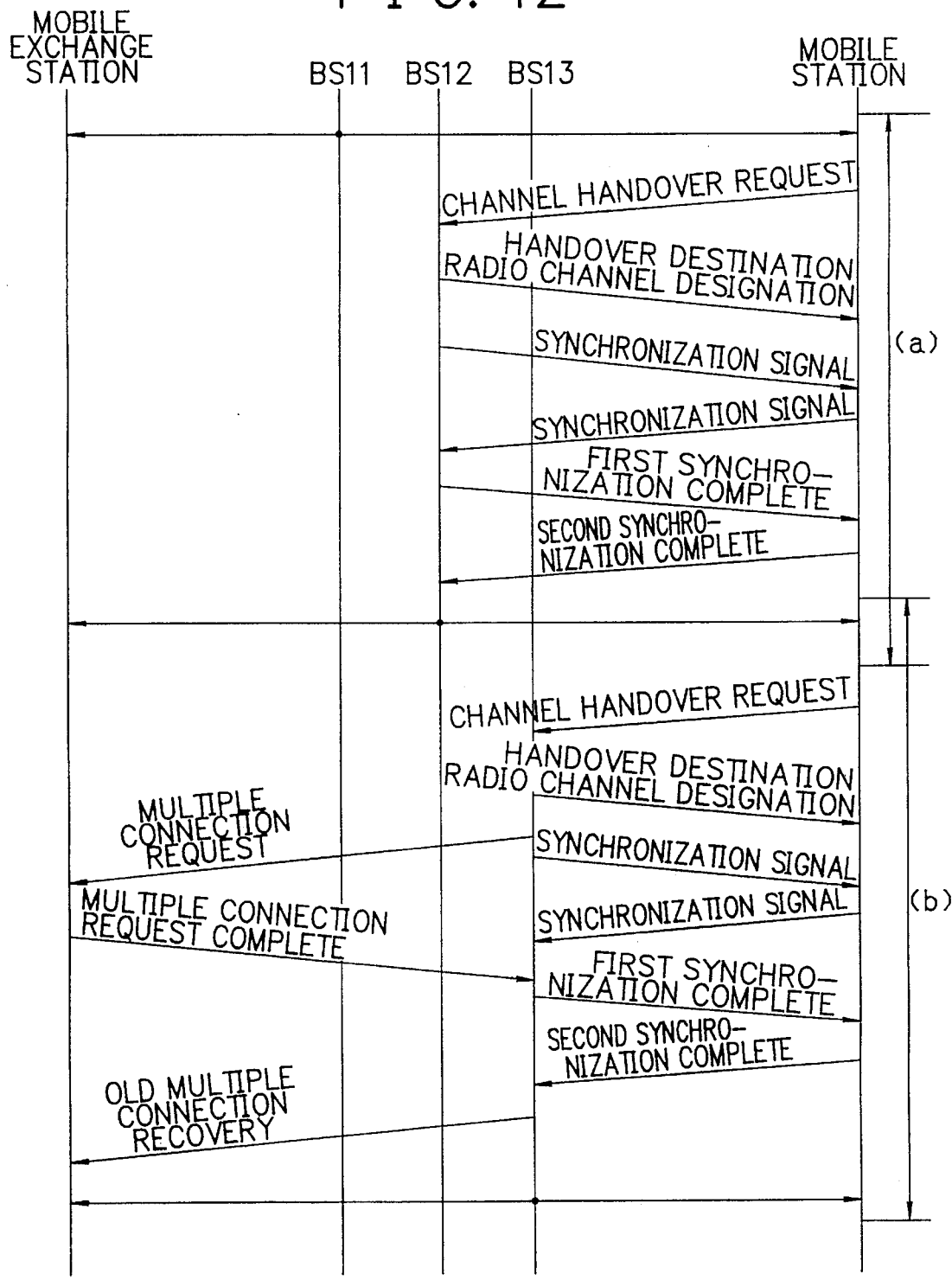
FIG. 12 is a schematic diagram for explaining the handover process in the mobile communication system shown in FIG. 6.

One example of the signal flow in the above handover process is illustrated in part (a) shown in FIG. 12, wherein the straight coupling line having both the end arrows, the black circle on the coupling line, and the white circle on the coupling line indicate the same as those described above with reference to FIG. 5.

While the mobile station telephones via the radio base station having the radio base station identifier BS11, the channel handover request is transmitted from the mobile station to the handover destination radio base station 212. When the handover destination radio channel designation is transmitted from the radio base station 212 to the mobile station, the mobile station waits for reception of the synchronization signal output from the handover destination radio base station 212. At this time, since the radio base station 212 has received the communication signal directed from the mobile exchange station 200 to the mobile station 220, the radio base station 212 does not process anything on the multiple connection. When receiving the synchronization signal, the mobile station transmits the synchronization signal. After receiving the synchronization signal from the mobile station, the handover destination radio base station 212 transmits the first synchronization completion signal. When receiving the first synchronization completion signal, the mobile station transmits the second synchronization completion signal and also hands over the radio line. In the case where, for example, the radio zone access is the TDMA method, this radio channel handover processing is executed in the time except during the communication to prevent the instant intermission at the radio channel handover.

Then, the movement of the mobile station 220 from the radio zone of the radio base station 212 to the radio zone of the radio base station 213 and the execution of the forward handover will be described. When receiving the radio channel handover request from the mobile station 220, the radio base station 213 has not received the communication signal directed to the mobile station 220 from the mobile exchange station 200, as shown by the communicable mobile station table 251. Hence, the radio base station 213 requests the mobile exchange station 200 to forward the communication signal directed to the mobile station 220. In response to this request, the mobile exchange station 200 changes the radio base station identifier BS11 written in the column of the mobile station identifier MS12 of the mobile station 220 in the multiple connection start information table 202 to the radio base station identifier BS13 of the radio base station 213, executes the multiple connection starting from the radio base station having the radio base station identifier BS13 as well, and transmits the communication signal directed to the mobile station to each radio base station. When receiving this communication signal directed to the mobile station, the radio base station 213 opens the radio line to this mobile station to continue the communication and carries out the processing for recovering the multiple connection with the radio base station having the radio base station identifier BS11 as the main station.

One example of the signal flow in the above handover process is illustrated in part (b) shown in FIG. 12, wherein the straight coupling line having both the end arrows, the black circle on the coupling line, and the white circle on the coupling line indicate the same as those described above in connection with FIG. 5.

While the mobile station telephones via the radio base station 212 having the radio base station identifier BS12, the channel handover request is transmitted from the mobile station to the handover destination radio base station 213. When the handover destination radio channel designation is transmitted from the radio base station 213 to the mobile station, the mobile station waits for the reception of the synchronization signal output from the radio base station 213. At this time, since the radio base station 213 has not received the communication signal directed from the mobile exchange station 200 to the mobile station 220, as shown by the communicable mobile station table 252, the radio base station 213 transmits the multiple connection request signal to the mobile exchange station 200. When receiving the synchronization signal from the handover destination radio base station 213, the mobile station transmits the synchronization signal. After receiving this synchronization signal from the mobile station, the handover destination radio base station 213 receives the multiple connection request completion signal from the mobile exchange station 200 and waits the execution of a new multiple connection. After the new multiple connection, the radio base station 213 transmits the first synchronization completion signal.

After receiving the first synchronization completion signal, the mobile station transmits the second synchronization completion signal. When receiving the second synchronization completion signal, the radio base station 213 opens the radio line to the mobile station to continue the communication and also transmits the old multiple connection recovery signal to the mobile exchange station 200. In the case where, for example, the zone access is the TDMA method, the radio channel handover processing is performed in the time except during the communication to prevent the instant intermission at the radio channel handover.

In this embodiment, when the contents of the multiple connection information table held by each radio base station are prepared by a similar method to a built-in radio zone disclosed in a paper of Holonic Location Registration/ Paging Procedure in Microcellular Mobile Telecommunication Systems by Taketsugu and Ohteru, Electronic Information Communications Association of Japan Transactions RCS91-33, 1991, the mobile station can perform the multiple connection with a radio base station with high moving possibility. This can also be applicable to the first embodiment of the present invention.

As apparent from the above description, according to the present invention, an essential part of a multiple connection method in a mobile communication system and a multiple connection method mobile communication system enabling to perform concise and high quality multiplex communication stores multiple connection start information for specifying a particular radio base station which started a communication with a mobile station and multiple connection information of identifiers of at least two multi-destination radio base stations to which a communication signal directed to the mobile station is transmitted. On the basis of these stored data, the communication signal is transmitted to only one of at least the two radio base stations having received the communication signal using a radio zone and the radio base stations corresponding to the stored identifiers can be selectively changed to execute the communication. The lines of the radio base station communicated with the mobile station and the radio base station with high moving possibility are opened in advance and the multiple connection is executed between a mobile exchange station and the radio base station, thereby reducing load of the mobile exchange station at a handover.

Further, according to the present invention, in the multiple connection method of the mobile communication system, the identifier of the radio base station that the mobile station has started a communication is stored as the multiple connection start information, and the communication signal including the identifier of the radio base station that the mobile station started the communication is transmitted to all the radio base stations controlled by the mobile exchange station, and each radio base station stores the identifiers of a plurality of radio base stations including each radio base station itself as the multiple connection information. The radio base station receives only the communication signal including the stored identifiers and after receiving the communication signal, the radio base station checks up whether or not to have opened the radio line to the mobile station. As a result of this checking, when the radio line has been opened to the mobile station, the radio base station transmits the received communication signal to the radio zone, and, when no radio line has been opened yet to the mobile station, the radio base station disuses the received communication signal. In this case, the multiple connection is previously carried out between the radio base station through which the mobile exchange station communicates with the mobile station and the radio base station with high moving possibility and the radio base station communicated with the mobile station and the radio base station with high moving possibility. As a result, the load of the mobile exchange station at the handover can be reduced and in the case where the forward handover is executed in the multi-destination connection configuration such as the LAN, quicker handover can be carried out.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A mobile communication system including a plurality of radio base stations, a mobile station communicating with the radio base stations using a radio channel in a plurality of radio zones composed of the radio base stations, and a mobile exchange station for controlling predetermined radio base stations communicating with the mobile station, comprising:

first storage means for storing multiple connection start information relating to the radio base station which started a communication with the mobile station; and second storage means for storing multiple connection information of identifiers of at least two radio base stations to which a communication signal directed to the mobile station which started the communication is simultaneously transmitted, wherein only one of the at least two radio base stations which received the communication signal transmitting the communication signal to the radio zone, the radio base stations corresponding to the identifiers as the multiple connection information stored in the second storage means being selectively handed over to execute the communication.

2. The mobile communication system as claimed in claim 1, wherein the first and second storage means are provided in the mobile exchange station.

3. The mobile communication system as claimed in claim 1, wherein a handover processing in transmitting the communication signal to the radio zone by the selective handover is carried out by a time division multiple access method.

4. The mobile communication system as claimed in claim 1, wherein in the handover processing, the mobile station requests a handover of the radio base stations to start a new communication with another one of the radio base stations corresponding to the identifiers as the multiple connection information stored in the second storage means.

5. The mobile communication system as claimed in claim 4, wherein, when the radio base station to meet the request of the mobile station is not contained in the multiple connection information, the mobile exchange station renews the content of the multiple connection information so as to contain the radio base station to meet the request in the multiple connection information to execute the handover processing.

6. A multiple connection method of a mobile communication system including a plurality of radio base stations, a mobile station communicating with the radio base stations using a radio channel in a plurality of radio zones composed of the radio base stations, and a mobile exchange station for controlling predetermined radio base stations communicating with the mobile station, comprising the steps of:

first storage step for storing multiple connection start information relating to the radio base station which started a communication with the mobile station; and second storage step for storing multiple connection information of identifiers of at least two radio base stations to which a communication signal directed to the mobile station which started the communication is simultaneously transmitted, wherein only one of the at least two radio base stations which received the communication signal transmitting the communication signal to the radio zone, the radio base stations corresponding to the identifiers as the multiple connection information stored in the second storage step being selectively handed over to execute the communication.

7. The multiple connection method as claimed in claim 6, wherein a handover processing in transmitting the communication signal to the radio zone by the selective handover is carried out by a time division multiple access method.

8. The multiple connection method as claimed in claim 6, wherein in the handover processing, the mobile station requests a handover of the radio base stations to start a new communication with another one of the radio base stations corresponding to the identifiers as the multiple connection information stored in the second storage step.

9. The multiple connection method as claimed in claim 8, wherein, when the radio base station to meet the request of the mobile station is not contained in the multiple connection information, the mobile exchange station renews the content of the multiple connection information so as to contain the radio base station to meet the request in the multiple connection information to execute the handover processing.

10. A multiple connection method of a mobile communication system including a plurality of radio base stations, a mobile station communicating with the radio base stations using a radio channel in a plurality of radio zones composed of the radio base stations, and a mobile exchange station for controlling predetermined radio base stations communicating with the mobile station, comprising the steps of:

- a first storage step for storing an identifier of the radio base station which started a communication with the mobile station as multiple connection start information by the mobile exchange station;
- a transmitting step for transmitting a communication signal including the identifier of the radio base station which started the communication to all the radio base stations controlled by the mobile exchange station;
- a second storage step for storing the identifiers of a plurality of radio base stations including each radio base station itself as multiple connection information by each radio base station;
- a selective receiving step for receiving only the communication signal including the identifier stored in the second storage step by the radio base stations;
- a checking step for checking whether or not the radio base station which received the communication signal in the receiving step opens a radio line with the mobile station; and
- a signal processing step for transmitting the received communication signal to the radio zone by the radio base station when the radio base station opens the radio line with the mobile station, and for not using the received communication signal when the radio base station does not open the radio line with the mobile station as a result in the checking step.

11. The multiple connection method as claimed in claim 10, wherein the radio base station executes the handover processing in response to a radio channel handover request of the mobile station.

12. The multiple connection method as claimed in claim 10, wherein, when the radio base station receives the communication signal in the selective receiving step, the handover processing is directly executed and, when the radio base station does not receive the communication signal in the selective receiving step, after the radio base station allows the mobile exchange station to change the identifier of the radio base station which started the communication with the mobile station in the multiple connection information stored in the mobile exchange station to its own identifier and transmits the communication signal directed to the mobile station to the radio base stations contained in the multiple connection information assigned to the radio base station itself to execute a multiple connection processing, the handover processing is executed.

* * * * *